United States Patent Office 3,496,214
Patented Feb. 17, 1970

3,496,214
CONDENSATION PRODUCTS OF CYANOACETYL UREA AND AMINE COMPLEXES
Hubert Meindl and Hans Ackermann, Riehen, and Fred von Kaenel, Arlesheim, Switzerland, assignors to J. R. Geigy A.G., Basel, Switzerland
No Drawing. Filed Apr. 4, 1966, Ser. No. 539,630
Claims priority, application Switzerland, Apr. 8, 1965, 4,960/65
Int. Cl. C07c 127/12, 121/08, 97/02
U.S. Cl. 260—465.4                    2 Claims

ABSTRACT OF THE DISCLOSURE

Novel compounds of the formula

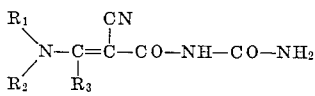

wherein each of $R_1$ and $R_2$ are alkyl radicals, or together with the nitrogen form a heteroaliphatic ring, $R_3$ is hydrogen or lower alkyl are formed by reacting a complex of the formula

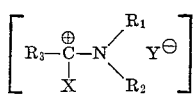

wherein X is halogen, acyloxy, alkoxy or di-substituted amino, and Y is an anion, with cyanacetyl urea. The novel compounds can be reacted with an alkaline condensing agent to obtain a 5-cyano-uracil of the formula

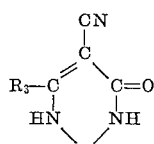

The 5-cyano-uracils are valuable intermediates in the synthesis of dyestuffs.

---

The present invention concerns a new process for the production of 5-cyano-uracil compounds as well as intermediate products formed in this process.

It is known that compounds of the 5-cyano-uracil series are obtained by reacting ethoxymethylene cyanacetyl urethanes of the formula

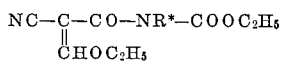

wherein R* represents hydrogen or the methyl group, with ammonia or with a primary amine $H_2N$—$R^{**}$. In this reaction, compounds of the formula

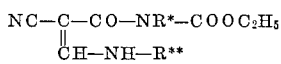

are obtained as intermediate products, wherein R** represents, for example, hydrogen or the methyl or phenyl group and R* has the meaning given above (J. Chem. Soc. 1955, 1834–40 and J. Chem. Soc. 1956, 1877 ff.). It is also known that 5-cyano-uracils can be produced by closing the ring of β-(S-ethyl-isothioureido)-α-cyano-acrylic acid-(S-ethyl-isothioureido) in the presence of hydrochloric acid, or by saponifying the ethyl-thio group in 2-ethylthio-4-hydroxy-5-cyano-pyrimidine (American Chemical Journal 42, 505–515 (1909)).

However, the known processes are of slight technical interest as they start from compounds which are sometimes obtained in unsatisfactory yields and sometimes have to be produced by reactions the stages of which are not clearly defined.

It has now been found that 5-cyano-uracil compounds can easily be produced in very good yields by reacting a complex compound of the formula

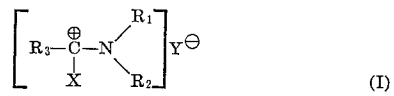

wherein each of $R_1$ and $R_2$ represents an alkyl radical, preferably lower alkyl of 1 to 4 carbon atoms, or
$R_1$ and $R_2$ together with the nitrogen to which they are linked form a non-aromatic, in particular a heteroaliphatic ring which, optionally, can contain further hetero atoms, especially oxygen,
$R_3$ represents hydrogen or a lower alkyl radical,
X represents halogen, an acyloxy, especially an inorganic acyloxy radical, an alkoxy radical or a di-substituted amino group and
Y represents an anion, with cyanacetyl urea, of the formula $$NC—CH_2—CO—NH—CO—NH_2 \quad (II)$$

in a medium as defined further below, to form a compound of the formula

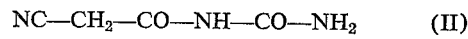
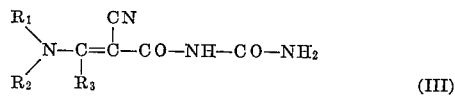

wherein $R_1$, $R_2$ and $R_3$ have the meanings given above, and reacting this compound in the presence of a preferably strong alkaline agent while separating the C—N-bond at the enamine group, to form a cyclic compound of Formula IV

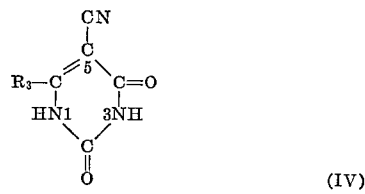

wherein $R_3$ has the same meaning as in Formula I.

Although it is known that compounds of Formula I react with activated methylene groups such as are found, e.g. in 4-amino-1,3-dimethyl uracil or cyanacetic acid ester (Chemische Berichte, 97, 1403 et seq. (1964); ibidem 94, 2278 (1961)); and it is also known that compounds of Formula I can be reacted with urea and derivatives thereof (ibidem 97, 61 et seq. (1964) and 98, 274 (1965)); however, the reaction of cyanacetyl urea with a complex compound as defined in Formula I to form a compound of Formula III is new. Indeed one would have expected from the results of the known reactions described hereinbefore that a double reaction of the compound of Formula I with cyanacetyl urea would ensue which would lead to entirely different types of novel compounds. Further, it is known from the literature that the cyano group in compounds of the structure:

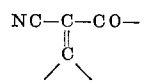

(such as also occurs in the compound of Formula III) is very reactive and, with the opening of the C—N triple bond, can take part in the ring closure (J. Pharm. Soc. Japan 74, 748 (1954)); it is thus surprising that compounds of Formula III can be converted almost quantitatively into 5-cyano-uracils of Formula IV.

Preferably $R_3$ represents hydrogen. When it represents a lower alkyl radical then this has usually from 1 to 4 carbon atoms.

When $R_1$ and $R_2$ together with the nitrogen form a non-aromatic ring, then this is, e.g. a 5-membered ring such as the pyrrolidine ring, or it is a 6-membered ring such as the piperidine ring. If they form a ring containing further hetero atoms then this is, e.g. the morpholine ring.

When X represents halogen, then it is particularly chlorine or bromine; if it is an acyloxy group then the "acyl" is principally an inorganic acyl radical such as the radical —$POCl_2$, —SOCl or —COCl. Alkoxy radicals symbolized by X are mainly lower alkoxy groups (having, in particular, 1 to 4 carbon atoms), principally the methoxy or ethoxy group. If X is a di-substituted amino group then this group preferably contains lower alkyl radicals as N-substituents.

Y represents, for example, a halide ion such as the chloride or bromide ion, or an alkosulphate ion having preferably 1 to 4 carbon atoms, e.g. the methosulphate or ethosulphate ion or an alcoholate ion, particularly a low alkylate ion such as the methylate or ethylate ion.

Preferably $R_1$ and $R_2$ each represent methyl or ethyl, X represents a lower alkoxy group and, Y represents a lower alkosulphate ion.

The greater number of complex compounds of Formula I usable as starting materials are known or they can be produced in the known way, for example by reacting amides of the Formula

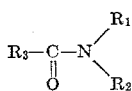

with acylating or alkylating agents, and optionally, by further reacting the complexes so obtained, e.g. by warming or reacting with amines or alkali alcoholates. Preferably inorganic acid chlorides are used as acylating agents, e.g. phosphorus oxychloride, thionyl chloride or phosgene and also their bromine analogues; mainly di-esters of sulphuric acid with lower alkanols are used as alkylating agents, e.g. dimethyl sulphate or diethyl sulphate.

The reaction of the complex compounds of Formula I with cyanacetyl urea to form the compound of Formula III is performed in an organic liquid reaction medium which is inert to the aforesaid reactants and in which the latter are at least partially soluble, advantageously in a polar, preferably anhydrous organic liquid or such liquid containing maximally 10% by weight of water, and in the presence of a condensing agent which reacts alkaline in water, at temperatures of about —10 to 120° C., and preferably from 10 to 100° C. Suitable polar organic liquids are, e.g. amides of lower fatty acids, particularly dimethyl formamide, or lower alkanols such as methanol, ethanol, glycol, cellosolve, e.g., methoxy-ethanol, ethoxy ethanol, dialkyl sulfoxides such as dimethyl sulfoxide, or acetonitrile.

The reaction may also be carried out in non-polar organic liquids as reaction medium, or in an excess of the complex compound of Formula I, or the amide compound thereof, over the equimolar amount which is required in order to attain completion of the reaction. Suitable non-polar organic liquids are, for instance, ketones such as acetone, ethers such as dioxane or tetrahydrofuran, or hydrocarbons which are preferably aromatic, such as toluene, and optionally chlorinated, e.g. chlorobenzene. Suitable condensing agents which react alkaline in water are, e.g. secondary and tertiary amines, particularly tertiary aliphatic amines, e.g. tri-lower alkylamines such as tri-methylamine or triethylamine, alkali metal carbonates, e.g. sodium or potassium carbonate, alkali metal hydroxides such as sodium hydroxide, potassium hydroxide or lithium hydroxide, sodium amide, or alkali metal alcoholates, particularly alkali metal alkylates such as sodium or potassium methylate or ethylate.

The intermediate product of Formula III can either be isolated or reacted directly to form the cyclic compound of Formula IV. Ring closure is effected advantageously in polar solvents e.g. in the organic solvents mentioned above or in water and in the presence of preferably strong condensing agents having an alkaline reaction in water, such as alkali metal carbonates, alkali metal alcoholates or aqueous alkali metal hydroxides, in the latter case, e.g. sodium or potassium hydroxide. Ring closure is preferably performed at a raised temperature, e.g. 30–150° C., preferably 50–100° C. Compounds of Formula III are cyclised to form 5-cyano-uracils of Formula IV while splitting off the group

The pH of the reaction medium should be above 8, and preferably above 10. The amount of condensing agent used determines the degree of conversion achieved. For complete conversion at least about 1 to preferably about 2.5 mol of sodium hydroxide per mol of compound of Formula IV or an excess thereover, are recommended.

The 5-cyano-uracils of Formula IV obtained by the new process are valuable intermediates in the synthesis of dyestuffs. Thus, on saponifying the cyano group in 5-cyano-uracil of Formula IV wherein $R_3$ represents hydrogen, uracil-5-carboxylic acid is obtained, via the uracil-5-carboxylic acid amide, and on replacing the hydroxyl groups in the latter by halogen by means of phosphorus halide, 2,4-dichloropyrimidine-5-carboxylic acid chloride is obtained which is suitable for the production of valuable reactive dyestuffs. If desired, saponification can be carried out in the reaction mixture containing the 5-cyano-uracil without first recovering the same from the latter.

Chlorination of compounds of Formula IV in which $R_3$ represents lower alkyl leads to known 2,4-dichloro-5-cyano-pyrimidines which are also useful as intermediates in the production of fiber-reactive dyestuffs.

The process according to the invention provides very high yields of pure end products. The advantages of the new process over known processes for the production of 5-cyano-uracils are that technically easily accessible starting materials can be used and that the end products are obtained in surprisingly high yield rates, in the order of 70% and even above 90% in the first stage, and above 90% in the second stage.

The following non-limitative examples illustrate the invention further. The temperatures are given therein in degrees centigrade. Percentages are by weight unless expressly stated otherwise.

EXAMPLE 1

(a) 12.7 g. of cyanacetyl urea are dissolved in 50 ml. of dimethyl formamide and the solution is combined with 24 g. of the complex compound of the formula

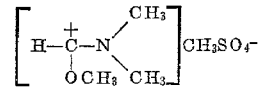

which complex compound is produced from dimethyl formamide and dimethyl sulfate, as described in Berichte 96, p. 1354 (1963). This mixture is cooled to 0° and, at 0–10°, 12 g. of triethylamine are added dropwise. The reaction mixture is stirred for another 2 hours at 20–30°. The N,N-dimethyl-aminomethylene cyanacetyl urea which precipitates during the reaction is filtered off under suction, washed with methanol and dried. It melts at 204°.

The yield is 14.7 g. (80.8% of the theoretical, calculated on the initial amount of cyanacetyl urea).

(b) 18.2 g. of N,N-dimethylaminoethylene cyanacetyl urea are stirred into 50 ml. of water. A solution of 10 g. of sodium hydroxide in 50 ml. of water is added during one hour to the suspension formed, while simultaneously heating so that the temperature of the mixture rises from 20–30° to 60°. The mixture is stirred for another hour at this temperature and then the solution formed is acidified with hydrochloric acid, cooled to 5–10° and the precipitated 5-cyano-uracil is filtered off under suction, washed with water and dried. The yield is 12.6 g. (93.5% of the theoretical, calculated on the 18.2 g. of intermediate used as starting material in the second stage).

If, instead of the 24 g. of complex compound from dimethyl formamide and dimethyl sulphate, an equimolar amount of the complex compound from dimethyl formamide and diethyl sulphate or diisopropyl sulphate is used, and otherwise the procedure given in the example is followed, then N,N-dimethylaminomethylene cyanacetyl urea is also obtained and, from it, 5-cyano-uracil.

EXAMPLE 2

12.7 g. of cyanacetyl urea is stirred into 50 ml. of methanol and the suspension is combined with 25.5 g. of the complex compound from dimethyl acetamide and dimethyl sulphate. A solution of 6.5 g. of sodium methylate in 40 ml. of methanol is added dropwise to this mixture at 10–20°. The reaction mixture is stirred for 5 hours at 30–40° and then a solution of 10 g. of sodium hydroxide in 50 ml. of water is added. The temperature of the mixture is maintained for 1 hour at about 60°; the solution is then acidified with hydrochloric acid, cooled to 10–15°, the precipitated 6-methyl-5-cyano-uracil is filtered off under suction, washed with a little water and dried. The yield is 10.7 g. (70.8% of the theoretical, calculated on the cyanacetyl urea).

The same compound is obtained if, instead of the 25.5 g. of the complex compound from dimethyl acetamide and dimethyl sulphate, equimolar amounts of the complex compound from dimethyl sulphate and diethyl acetamide or N-acetyl piperidine or N-acetyl morpholine are used and otherwise the procedure given in the example is followed.

6-ethyl-5-cyano-uracil is obtained by repeating the above example, but using in lieu of 25.5 g. of the complex compound from dimethyl acetamide and dimethyl sulphate, an equivalent amount of the complex compound obtained from dimethyl propionamide and dimethyl sulphate.

EXAMPLE 3

127 g. of cyanacetyl urea are mixed with stirring with 400 ml. of methanol and cooled to 10°. To the mixture, 240 g. of the complex compound from dimethyl formamide and dimethyl sulphate as well as a solution of 46 g. of sodium hydroxide in 230 ml. of methanol are added simultaneously dropwise over a period of 2 hours, while maintaining the temperature of the mixture at 10 to 15°. The mixture is stirred for one hour at this temperature, 400 ml. of water are then added and the precipitated crystals are separated by filtration, washed with water and dried. 170 g. of N,N-dimethylaminomethylene-cyanacetyl urea are obtained, which corresponds to a yield rate of 93.5% of the theory, calculated on the cyanacetyl urea.

The final product is converted into 5-cyano-uracil in the same manner as described in the second step of Example 1.

EXAMPLE 4

16.3 g. of diethylamine are added to 22 g. of the complex compound from dimethylformamide and dimethylsulphate, whereby the temperature of the mixture rises to 40 to 50°. A solution of 12.7 g. of cyanacetyl urea in 85 ml. of dimethyl formamide is run into the foregoing reaction mixture and the whole is held with stirring at 80 to 90° for two hours. Upon cooling, a crystallisate is formed which is separated by filtration, and then slurried in 50 ml. of water, to the resulting slurry there are added 15 ml. of aqueous 10% sodium hydroxide solution and the whole is stirred for 3 hours at 80 to 90°. The resulting solution is acidified with 10 ml. of aqueous 36% hydrochloric acid and the 5-cyano-uracil which precipitates in crystalline form is separated by filtration. (Yield rate 30% calculated on the cyanacetyl urea.)

EXAMPLE 5

A solution of 6.5 g. of sodium methylate in 80 ml. of methanol is added dropwise to 25.5 g. of the complex compound from dimethyl formamide and dimethyl sulphate at 20 to 30°. The mixture is stirred for one hour at the stated temperature and 12.5 g. of cyanacetyl urea are gradually added thereto. After about 5 hours, the N,N-dimethylaminomethylene-cyanacetyl urea thus formed is separated from the reaction mixture by suction filtration and then washed with methanol and dried. The yield of 7 g. corresponds to about 40% of the theory calculated on the cyanacetyl urea. The final product is converted to 5-cyano-uracil in the manner described in the second step of Example 1.

We claim:
1. A compound of the formula

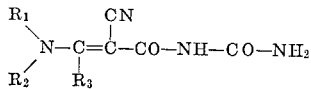

wherein each of $R_1$ and $R_2$ represents lower alkyl and $R_3$ represents hydrogen or lower alkyl.

2. The compound of the formula

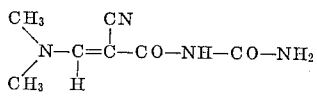

References Cited

Bredereck et al.: Chemische Berichte, vol. 97, No. 11, pp. 3081–3087, 1964.

CHARLES B. PARKER, Primary Examiner

S. T. LAWRENCE III, Assistant Examiner

U.S. Cl. X.R.

260—260, 459, 583